(12) United States Patent
Witham et al.

(10) Patent No.: US 11,834,607 B2
(45) Date of Patent: Dec. 5, 2023

(54) ADDITIVES FOR ENHANCED EXTRACTION OF BITUMEN

(71) Applicant: Dow Global Technologies LLC, Midland, MI (US)

(72) Inventors: Cole A. Witham, Freeport, TX (US); Roxanne M. Jenkins, Lake Jackson, TX (US); Biplab Mukherjee, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/973,870

(22) PCT Filed: Jun. 28, 2019

(86) PCT No.: PCT/US2019/039847
§ 371 (c)(1),
(2) Date: Dec. 10, 2020

(87) PCT Pub. No.: WO2020/006422
PCT Pub. Date: Jan. 2, 2020

(65) Prior Publication Data
US 2021/0301194 A1 Sep. 30, 2021

Related U.S. Application Data

(60) Provisional application No. 62/691,713, filed on Jun. 29, 2018.

(51) Int. Cl.
*C09K 8/592* (2006.01)
*E21B 43/24* (2006.01)
*C10G 1/04* (2006.01)

(52) U.S. Cl.
CPC .............. *C09K 8/592* (2013.01); *C10G 1/045* (2013.01); *C10G 1/047* (2013.01); *E21B 43/2406* (2013.01)

(58) Field of Classification Search
None
See application file for complete search history.

(56) References Cited

U.S. PATENT DOCUMENTS

| 3,221,813 A | 12/1965 | Closmann et al. |
| 3,353,598 A | 11/1967 | Smith |

(Continued)

FOREIGN PATENT DOCUMENTS

| CA | 2968062 | * 11/2018 | ............ E21B 43/24 |
| CN | 107384349 A | 11/2017 | |
| WO | 2018111342 | 6/2018 | |

OTHER PUBLICATIONS

International Preliminary Report on Patentability for related PCT Application PCT/US2019/039847, dated Jan. 7, 2021 (7 pgs).

(Continued)

*Primary Examiner* — Anuradha Ahuja
(74) *Attorney, Agent, or Firm* — Brooks, Cameron & Huebsch, PLLC

(57) ABSTRACT

A method for recovering bitumen that includes contacting the bitumen with steam and/or water and an organic amine having a boiling point at one atmosphere of greater than 145° C. and recovering the bitumen. The bitumen can be in oil sands, where the step of contacting includes contacting the oil sands having bitumen with the steam and/or water and the organic amine. Contacting the bitumen with the steam and/or water and the organic amine and recovering the bitumen can be done in-situ in a subterranean formation.

9 Claims, 2 Drawing Sheets

(56) References Cited

U.S. PATENT DOCUMENTS

| | | | |
|---|---|---|---|
| 3,782,472 A * | 1/1974 | Siess, Jr. | E21B 43/24 |
| | | | 166/303 |
| 4,156,463 A | 5/1979 | Hall | |
| 4,212,353 A * | 7/1980 | Hall | E21C 45/00 |
| | | | 166/267 |
| 4,446,054 A * | 5/1984 | Bessler | C09K 8/58 |
| | | | 516/146 |
| 4,459,202 A * | 7/1984 | Garcia | C10G 1/04 |
| | | | 252/364 |
| 4,522,732 A | 6/1985 | Purcell et al. | |
| 5,721,296 A | 2/1998 | Mizunuma et al. | |
| 6,305,472 B2 | 10/2001 | Richardson et al. | |
| 7,770,643 B2 | 8/2010 | Daussin | |
| 7,938,183 B2 | 5/2011 | Hart et al. | |
| 9,469,813 B2 | 10/2016 | Favero et al. | |
| 10,316,242 B2 | 6/2019 | Duenckel et al. | |
| 2013/0081808 A1 | 4/2013 | Zeidani et al. | |
| 2015/0307787 A1 | 10/2015 | Akiya et al. | |
| 2017/0051597 A1 | 2/2017 | Akiya et al. | |
| 2017/0241250 A1 | 8/2017 | Singh et al. | |
| 2019/0225889 A1 | 7/2019 | Tulchinsky et al. | |

OTHER PUBLICATIONS

International Search Report & Written Opinion for related PCT Application PCT/US2019/039847, dated Sep. 26, 2019 (12 pgs).
Dang A-lei, Li Tie-hu, Zhang Wen-juan, Zhao Ting-kai, Fang Chang-qing, Wang Zhen, "Newest research progress of coal tar pitch." Carbon Techniques, 2011, vol. 30, No. 6, 7 pages.

\* cited by examiner

ADDITIVES FOR ENHANCED EXTRACTION OF BITUMEN

This application is a National Stage Application under 35 U.S.C. § 371 of International Application Number PCT/US2019/039847, filed Jun. 28, 2019 and published as WO 2020/006422 on Jan. 2, 2020, which claims the benefit to U.S. Provisional Application 62/691,713, filed Jun. 29, 2018, the entire contents of which are incorporated herein by reference in its entirety

FIELD OF DISCLOSURE

The present disclosure relates to the recovery of bitumen. More particularly, the present disclosure provides additives for enhanced extraction of bitumen through either surface mining or in-situ recovery.

BACKGROUND

Deposits of oil sands are found around the world, but most prominently in Canada, Venezuela, and the United States. These oil sands contain significant deposits of heavy oil, typically referred to as bitumen. Bitumen has been defined as any liquid petroleum with an API gravity of less than 20. The bitumen from these oil sands may be extracted and refined into synthetic oil or directly into petroleum products. The difficulty with bitumen lies in that it typically is very viscous, sometimes to the point of being more solid than liquid. Thus, bitumen typically does not flow as less viscous, or lighter, crude oils do.

Because of the viscous nature of bitumen, it cannot be produced from a well drilled into the oil sands as is the case with lighter crude oil. This is so because the bitumen simply does not flow without being first heated, diluted, and/or upgraded. Since normal oil drilling practices are inadequate to produce bitumen, several methods have been developed over several decades to extract and process oil sands to remove the bitumen. For shallow deposits of oil sands, a typical method includes surface extraction, or mining, followed by subsequent treatment of the oil sands to remove the bitumen.

The development of surface extraction processes has occurred most extensively in the Athabasca field of Canada. In these processes, the oil sands are mined, typically through strip or open pit mining with draglines, bucket-wheel excavators, and, more recently, shovel and truck operations. The oil sands are then transported to a facility to process and remove the bitumen from the sands. These processes typically involve a solvent of some type, most often water or steam, although other solvents, such as hydrocarbon solvents, have been used.

After excavation, a hot water extraction process is typically used in the Athabasca field in which the oil sands are mixed with water at temperatures ranging from approximately 35° C. to 75° C., with recent improvements lowering the temperature necessary to the lower portion of the range. An extraction agent, such as sodium hydroxide (NaOH), surfactants, and/or air may be mixed with the oil sands.

Water is added to the oil sands to create an oil sands slurry, to which additives such as NaOH may be added, which is then transported to an extraction plant, typically via a pipeline. Inside a separation vessel, the slurry is agitated and the water and NaOH releases the bitumen from the oil sands. Air entrained with the water and NaOH attaches to the bitumen, allowing it to float to the top of the slurry mixture and create a froth. The bitumen froth is further treated to remove residual water and fines, which are typically small sand and clay particles. The bitumen is then either stored for further treatment or immediately treated, either chemically or mixed with lighter petroleum products, and transported by pipeline for upgrading into synthetic crude oil. Unfortunately, this method cannot be used for deeper tar sand layers. In-situ techniques are necessary to recover deeper oil in well production. It is estimated that around 80 percent of the Alberta tar sands and almost all Venezuelan tar sands are too far below the surface to use open pit mining.

In well production, referred to as in-situ recovery, Cyclic Steam Stimulation (CSS) is the conventional "huff and puff" in-situ method in which steam is injected into the well at a temperature of 250° C. to 400° C. The steam rises and heats the bitumen, decreasing its viscosity. The well is allowed to sit for days or weeks, and then hot oil mixed with condensed steam is pumped out for a period of weeks or months. The process is then repeated. Unfortunately, the "huff and puff" method requires the site to be shut down for weeks to allow pumpable oil to accumulate. In addition to the high cost to inject steam, the CSS method typically results in only 20 to 25 percent recovery of the available oil.

Steam Assisted Gravity Drainage (SAGD) is another in-situ method where two horizontal wells are drilled in the tar sands, one at the bottom of the formation and another five meters above it. The wells are drilled in groups off of central pads. These wells may extend for miles in all directions. Steam is injected into the upper well, thereby melting the bitumen which then flows into the lower well. The resulting liquid oil mixed with condensed steam is subsequently pumped to the surface. Typical recovery of the available oil is 40 to 60 percent.

The above methods have many costs, environmental and safety problems associated with them. For example, the use of large amounts of steam is energy intensive and requires the processing and disposal of large amounts of water. Currently, tar sands extraction and processing require several barrels of water for each barrel of oil produced. Strip mining and further treatment results in incompletely cleaned sand, which requires further processing, before it can be returned to the environment. Further, the use of a large quantity of caustic in surface mining not only presents process safety hazards but also contributes formation of fine clay particles in tailings, the disposal of which is a major environmental problem.

Thus, there remains a need for efficient, safe and cost-effective methods to improve the recovery of bitumen from oil sands.

SUMMARY

The present disclosure is an improved method for bitumen recovery that includes treating bitumen, including oil sands containing bitumen, with specific polyamines discussed herein. The method of the present disclosure is suitable for recovering bitumen from oil sands recovered by surface mining or in-situ production to oil sands in a subterranean reservoir.

Specifically, embodiments of the present disclosure include a method for recovering bitumen that includes contacting bitumen with steam and/or water and an organic amine having a boiling point at one atmosphere of greater than 145° C. and recovering the bitumen having been contacted with the steam and/or water and the organic amine. For the various embodiments, the bitumen can be present in oil sands and the step of contacting includes contacting the oil sands having bitumen with the steam and/or water and the organic amine and recovering the bitumen from the oil sands. In one embodiment, the step of contacting the bitumen with the steam and/or water and the organic amine and recovering the bitumen is done in-situ in a subterranean formation. Alternatively, the step of contacting the bitumen with the steam and/or water and the organic amine and recovering the bitumen is done in an ex-situ extraction process.

For the embodiments described herein, there can be an order in which the bitumen comes into contact with the steam and/or the water and the organic amine having the boiling point at one atmosphere of greater than 145° C. For example, in one embodiment, the method of the present disclosure includes combining the organic amine with the steam and/or water to produce an extraction composition and contacting the bitumen with the extraction composition to reduce the viscosity of the bitumen. In an alternative embodiment, the method can include first contacting the bitumen with the organic amine and then second contacting the bitumen with the organic amine with the steam and/or water. As mentioned, the bitumen can be in oil sands and the step of contacting includes contacting the oil sands having bitumen with the steam and/or water and the organic amine, as discussed above with the step of recovering the bitumen from the oil sands.

For the various embodiments, the organic amine is present with steam and/or water at a concentration of up to 5 weight percent (wt. %) based on the total weight of the steam and/or water and the organic amine.

DETAILED DESCRIPTION

Figure 1:
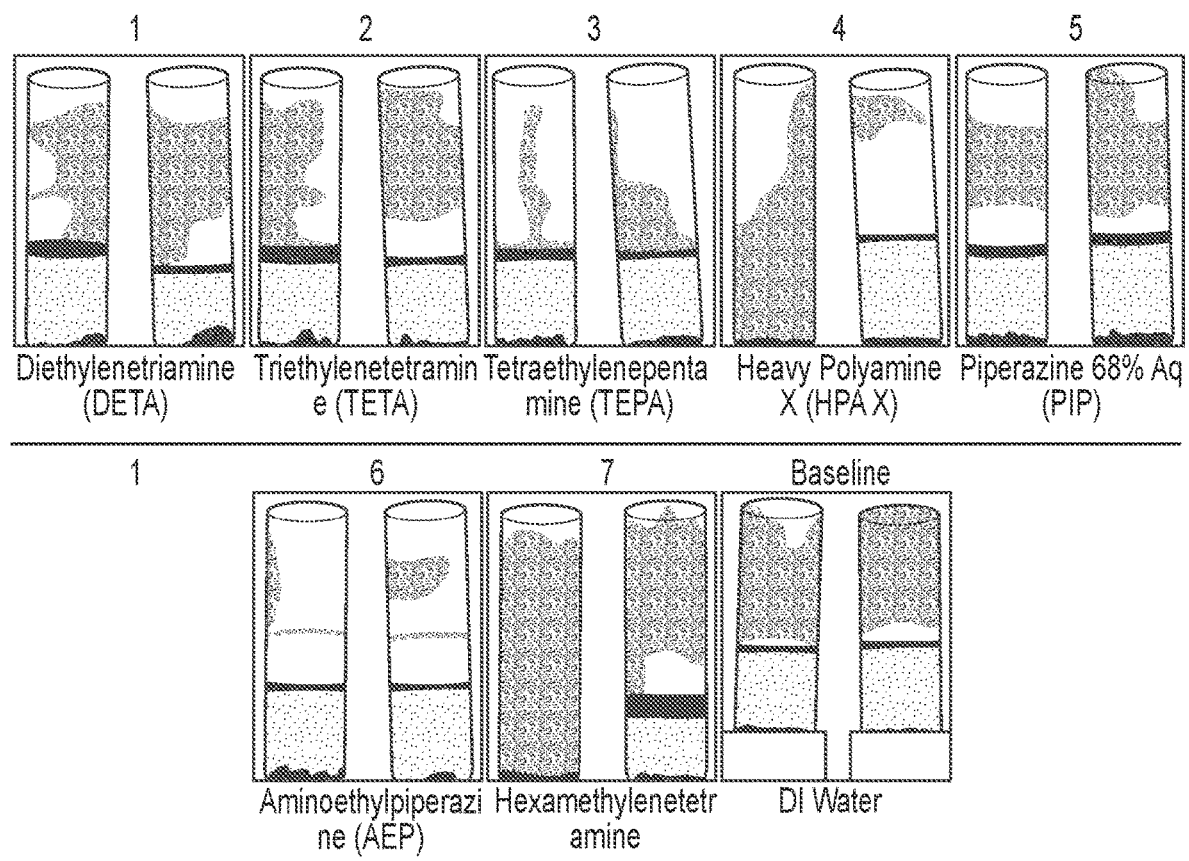
FIG. 1 provides images of samples according to the present disclosure.

The present disclosure is an improved method for bitumen recovery that includes treating oil sands containing bitumen with a specific polyamine, as discussed herein. The method of the present disclosure is suitable for recovering bitumen from oil sands recovered by surface mining (ex-situ production) or in-situ production to oil sands in a subterranean reservoir.

Embodiments of the present disclosure include a method for recovering bitumen that includes contacting bitumen with steam and/or water and an organic amine having a boiling point at one atmosphere of greater than 145° C. and recovering the bitumen having been contacted with the steam and/or water and the organic amine. The organic amine as provided herein can help to increase bitumen production from a variety of extraction techniques, including as a part of a Steam Assisted Gravity Drainage (SAGD) process, among others as discussed herein.

For the various embodiments discussed herein, the organic amine of the present disclosure has a boiling point at one atmosphere of greater than 145° C. In preferred embodiments, the organic amine having this property include those that are an organic polyamine. An organic polyamine can be defined in different ways, but for the present disclosure the organic polyamine is defined as an organic compound having more than two amino groups with aliphatic and/or aromatic chains. Aliphatic chains can include straight-chain, branched-chain, cyclic-chains or combinations thereof. Preferably, the organic polyamine having a boiling point at one atmosphere of greater than 145° C. for the present disclosure is selected from the group consisting of diethylenetriamine, N,N,N',N'',N''-pentamethyldiethylenetriamine, aminoethylpiperazine; hexamethylenetetramine; bis(hexamethylene)triamine; 1,3,5-benzenetriamine; diethylenetriamine, triethylenetetramine, tetraethylenepentamine, aminoethyl piperazine, bis(hexamethylene)triamine, polylysine, polyornithine, polyallylamine, dipropylenetriamine, triproplyenetetraamine, 1,2-bis(3-aminopropylamino)ethane, bis(hexamethylene)triamine, histamine, agmatine, cytosine; polymers of ethylene diamine, triethylene tetra-amine, tributyl tetra-amine, tetraethyl penta-amine, pentaethyl hexa-amine, hexaethyl heptaamine, heptaethyl octa-amine, bis-hexamethytriamine and combinations thereof. In one embodiment, the organic amine is preferably hexamethylenetetramine.

The separation of bitumen and/or heavy oil from oil sands is accomplished by, but not limited to, two methods; surface mining or in-situ recovery sometimes referred to as well production. The surface mining operation and subsequent extraction of the bitumen according to the present disclosure help constitute an ex-situ extraction process, as compared to the in-situ production process also discussed herein. In the ex-situ extraction process, the oil sands may be recovered by surface or strip mining and transported to a treatment area. A good summary can be found in the article "Understanding Water-Based Bitumen Extraction from Athabasca Oil Sands", J. Masliyah, et al., *Canadian Journal of Chemical Engineering*, Volume 82, August 2004. The basic steps in bitumen recovery via surface mining include: extraction, froth treatment, tailings treatment, and upgrading. The steps are interrelated; the mining operation affects the extraction and in turn the extraction affects the upgrading operation.

Typically, in commercial bitumen recovery operations, the oil sand is mined in an open-pit mine using trucks and shovels. The mined oil sands are transported to a treatment area. The extraction step includes crushing the oil sand lumps and mixing them with (recycle process) water in mixing boxes, stirred tanks, cyclo-feeders or rotary breakers to form conditioned oil sands slurry. The conditioned oil sands slurry is introduced to hydrotransport pipelines or to tumblers, where the oil sand lumps are sheared, and size reduction takes place. Within the tumblers and/or the hydrotransport pipelines, bitumen is recovered or "released", or "liberated", from the sand grains. Chemical additives can be added during the slurry preparation stage; for examples of chemicals known in the art see US2008/0139418, incorporated by reference herein in its entirety. In typical operations, the operating slurry temperature ranges from 35° C. to 75° C., preferably 40° C. to 55° C.

Entrained or introduced air attaches to bitumen in the tumblers and hydrotransport pipelines creating froth. In the froth treatment step, the aerated bitumen floats and is subsequently skimmed off from the slurry. This is accomplished in large gravity separation vessels, normally referred to as primary separation vessels (PSV), separation cells (Sep Cell) or primary separation cells (PSC). Small amounts of bitumen droplets (usually un-aerated bitumen) remaining in the slurry are further recovered using either induced air flotation in mechanical flotation cells and tailings oil recovery vessels, or cyclo-separators and hydrocyclones. Generally, overall bitumen recovery in commercial operations is about 88 to 95 percent of the original oil in place. The recovered bitumen in the form of froth normally contains 60 percent bitumen, 30 percent water and 10 percent solids. The bitumen froth recovered is then de-aerated and diluted (mixed) with solvents to provide sufficient density difference between water and bitumen and to reduce the bitumen viscosity. The dilution by a solvent (e.g., naphtha or hexane) facilitates the removal of the solids and water from the bitumen froth using inclined plate settlers, cyclones and/or centrifuges. When a paraffinic diluent (solvent) is used at a sufficiently high diluent to bitumen ratio, partial precipitation of asphaltenes occurs. This leads to the formation of composite aggregates that trap the water and solids in the diluted bitumen froth. In this way gravity separation is greatly enhanced, potentially eliminating the need for cyclones or centrifuges.

In the tailings treatment step, the tailings stream from the extraction plant goes to the tailings pond for solid-liquid separation. The clarified water is recycled from the pond back to the extraction plant. To accelerate tailings handling, gypsum may be added to mature fine tailings to consolidate the fines together with the coarse sand into a non-segregating mixture. This method is referred to as the consolidated (composite) tailing (CT) process. CT is disposed of in a geotechnical manner that enhances its further dewatering and eventual reclamation. Optionally, tailings from the extraction plant are cycloned, with the overflow (fine tailings) being pumped to thickeners and the cyclone underflow (coarse tailings) to the tailings pond. Fine tailings are treated with flocculants, then thickened and pumped to a tailings pond. Further, the use of paste technology (addition of flocculants/polyelectrolytes) or a combination of CT and paste technology may be used for fast water release and recycle of the water in CT to the extraction plant for bitumen recovery from oil sands.

In the final step, the recovered bitumen is upgraded. Upgrading either adds hydrogen or removes carbon to achieve a balanced, lighter hydrocarbon that is more valuable and easier to refine. The upgrading process also removes contaminants such as heavy metals, salts, oxygen, nitrogen and sulfur. The upgrading process includes one or more steps such as: distillation wherein various compounds are separated by physical properties, coking, hydro-conversion, solvent deasphalting to improve the hydrogen to carbon ratio, and hydrotreating which removes contaminants such as sulfur.

The methods of the present disclosure can be used for bitumen recovery in the ex-situ extraction process discussed above. For example, in one embodiment of the present disclosure the improvement to the process of recovering bitumen from oil sands is by the addition of the organic amine having a boiling point at one atmosphere of greater than 145° C., as discussed above, during the slurry preparation stage. The sized material is added to a slurry tank with agitation and combined with the organic amine having the boiling point at one atmosphere of greater than 145° C.

The organic amine may be added to the water of the oil sands slurry neat or as an extraction composition. If added as an extraction composition, the organic amine is first combined (e.g., mixed) with the steam and/or water before contacting the bitumen and subsequent recovering of the bitumen. For the various embodiments, the organic amine is present with water at a concentration of up to 5 weight percent (wt. %) based on the total weight of the water and the organic amine. For example, the organic amine is present with water from a concentration of 100 parts per million (ppm) to 5 wt. % (50,000 ppm) based on the total weight of the water and the organic amine. Preferably, the organic amine is present with water at a concentration of 0.01 wt. % to 1 wt. % based on the total weight of the water and the organic amine.

The organic amine solution/oil sand slurry is typically agitated from 5 minutes to 4 hours, preferably for an hour or less. Preferably, the organic amine solution/oil sands slurry is heated to equal to or greater than 35° C., more preferably equal to or greater than 40° C., more preferably equal to or greater than 55° C., more preferably equal to or greater than 60° C. Preferably, the organic amine solution/oil sands slurry is heated to equal to or less than 100° C., more preferably equal to or less than 80° C., and more preferably equal to or less than 75° C.

As outlined herein above, the organic amine treated slurry may be transferred to a separation tank, typically comprising a diluted detergent solution, wherein the bitumen and heavy oils are separated from the aqueous portion. The solids and the aqueous portion may be further treated to remove any additional free organic matter.

In another embodiment of the present disclosure, bitumen is recovered from oil sands in-situ in a subterranean formation, where the bitumen in the oil sands are contacted with steam and/or water and the organic amine as described above to allow for recovering the bitumen. The two most common methods of in-situ production recovery are cyclic steam stimulation (CSS) and steam-assisted gravity drainage (SAGD). CSS can utilize both vertical and horizontal wells that alternately inject steam and pump heated bitumen to the surface, forming a cycle of injection, heating, flow and extraction. SAGD utilizes pairs of horizontal wells placed one over the other within the bitumen pay zone. The upper well is used to inject steam, creating a permanent heated chamber within which the heated bitumen flows by gravity to the lower well, which extracts the bitumen. However, technologies, such as vapor recovery extraction (VAPEX) and cold heavy oil production with sand (CHOPS) are being developed.

The basic steps in the in-situ treatment to recover bitumen from oil sands includes: steam injection into a well, recovery of bitumen from the well, and dilution of the recovered bitumen, for example with condensate, for shipping by pipelines.

In accordance with the method of the present disclosure, the organic amine is used as an additive to steam and/or water in an in-situ bitumen recovery process from a subterranean oil sand reservoir. The mode of steam injection may include one or more of steam drive, steam soak, or cyclic steam injection in a single or multi-well program. Water flooding may be used in addition to one or more of the steam injection methods listed herein above.

For the embodiments of the present disclosure, there can be an order in which the bitumen comes into contact with the steam and/or the water and the organic amine having the boiling point at one atmosphere of greater than 145° C. provided above. For example, in one embodiment, the method of the present disclosure includes combining the organic amine with the steam and/or water to produce an extraction composition and contacting the bitumen with the extraction composition to reduce the viscosity of the bitumen in the in-situ process provided herein. In an alternative embodiment, the method can include first contacting the bitumen in-situ with the organic amine and then second contacting the bitumen with the organic amine in-situ with the steam and/or water.

As discussed in the previous paragraph, the organic amine may be added to the oil sands in the subterranean formation neat or as an extraction composition, as discussed herein. For the various embodiments, the organic amine is present with steam and/or water at a concentration of up to 5 wt. % based on the total weight of the steam and/or water and the organic amine. For example, the organic amine is present with steam and/or water from a concentration of 100 parts per million (ppm) to 5 wt. % (50,000 ppm) based on the total weight of the steam and/or water and the organic amine. Preferably, the organic amine is present with steam and/or water at a concentration of 0.01 wt % to 1 wt. % based on the total weight of the steam and/or water and the organic amine.

Typically, the steam is injected into an oil sands reservoir through an injection well, and wherein formation fluids, comprising reservoir and injection fluids, are produced either through an adjacent production well or by back flowing into the injection well.

In most oil sand reservoirs, a steam temperature of at least 180° C., which corresponds to a pressure of 150 psi (1.0 MPa), or greater is needed to mobilize the bitumen. Preferably, the organic amine is introduced to the reservoir at a temperature in the range of from 150° C. to 300° C., preferably 180° C. to 260° C. The particular temperature and pressure used in the process of the present disclosure will depend on such specific reservoir characteristics as depth, overburden pressure, pay zone thickness, and bitumen viscosity, and thus will be worked out for each reservoir.

It is preferable to inject the organic amine simultaneously with the steam and/or water in order to ensure or maximize the amount of organic amine actually moving with the steam. In some instances, it may be desirable to precede or follow the injection of the organic amine with the steam and/or water with a steam-only injection stream. In this case, the steam temperature can be raised above 260° C. during the steam-only injection. The term "steam" used herein is meant to include superheated steam, saturated steam, and less than 100 percent quality steam.

For purposes of clarity, the term "less than 100 percent quality steam" refers to steam having a liquid water phase present. Steam quality is defined as the weight percent of dry steam contained in a unit weight of a steam-liquid mixture. "Saturated steam" is used synonymously with "100 percent quality steam". "Superheated steam" is steam which has been heated above the vapor-liquid equilibrium point. If superheated steam is used, the steam is preferably superheated to between 5° C. to 50° C. above the vapor-liquid equilibrium temperature, prior to adding the organic amine.

The organic amine may be added to the oil sands in-situ in the subterranean formation neat or as an extraction composition, as discussed herein. If added as an extraction composition, the organic amine is first combined (e.g., mixed) with the steam and/or water before contacting the bitumen and subsequent recovering of the bitumen. Once in contact with the bitumen, the extraction composition helps to reduce the viscosity of the bitumen. Preferably, the organic amine is substantially volatilized and carried into the reservoir as an aerosol or mist. Here again, the rationale is to maximize the amount of organic amine traveling with the steam into the reservoir.

The organic amine is preferably injected intermittently or continuously with the steam, so that the steam-organic amine injection stream reaches the downhole formation through common tubing. The rate of organic amine addition is adjusted so as to maintain the organic amine concentration of up to 5 wt. % based on the total weight of the steam and/or water and the organic amine. The rate of steam injection for a typical oil sands reservoir might be on the order of enough steam to provide an advance through the formation of from 1 to 3 feet/day.

The method of the present disclosure can also include the use of additional additives with the organic amine having a boiling point at one atmosphere of greater than 145° C. Examples of such additives include, but are not limited to, amines, glycol ether amines and alcohols. Such additives can be present in amounts up to 10 wt. % based on the total weight of the organic amine, the additive, steam and/or water.

EXAMPLES

The organic polyamines seen in Table 1 are all commercially available from Sigma-Aldrich unless otherwise noted.

TABLE 1

Specific Polyamines and their Structures

| | |
|---|---|
| 1 Diethylenetriamine (DETA) | 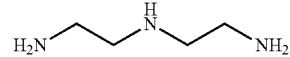 |
| 2 Triethylenetetramine (TETA) | 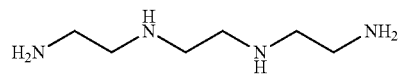 |
| 3 Tetraethylenepentamine (TEPA) | 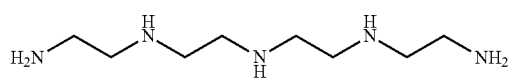 [SMILES: NCCNCCNCCNCCN] |
| 4 Heavy Polyamine X (HPA X) | a complex mixture of linear, branched, and cyclic ethyleneamines (The Dow Chemical Company) |
| 5 Piperazine (as per definition is not a polyamine but it used here as comparison) | 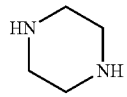 |
| 6 Aminoethylpiperazine (AEP) | 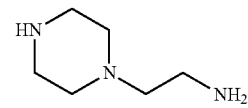 |

TABLE 1-continued

Specific Polyamines and their Structures

7 Hexamethylenetetramine

Parallel Pressure Reactor (PPR) Testing

Prepared a first set of samples for each of the polyamines provided in Table 1 by mixing approximately 0.5 gram (g) of the oil sand, 5 milliliter (mL) of deionized (DI) water and 0.05 g of the polyamine in a 12 mL glass vial. Cap the vial loosely and place the sample in a convection over set at a temperature of 120° C. for 45 minutes. After 45 minutes turn the oven off and allow the sample to cool slowly to room temperature (23° C.). Once cooled, place the sample on a white background and take an image of the sample. Conduct a baseline experiment as described above but do not use a polyamine in the sample.

Prepare a second set of samples as described above, where each sample is placed in a Symyx Parallel Pressure Reactors (PPR) at 200° C. and approximately 150 psi for one hour. These reactions conditions are representative of the minimum steam conditions necessary to mobilize bitumen in oil-field reservoir using steam-assisted gravity drainage (SAGD) applications. At the end of 1 hour, cool the sample and take an image of the sample.

The polyamines was deemed to have a positive impact on bitumen liberation from the oil sand if the free oil attached along the glass wall of the vial, above the liquid level, and water turbidity was higher compared to the baseline. High water turbidity of the water phase indicated release of oil from the oil sands into the water and it is considered as good from the standpoint of better recovery.

The images of the samples are as follows (FIG. 1), where the vial seen on the left for each sample is from the first set of samples (sample placed in the convection oven set at 120° C. for 45 minutes) and the vial seen on the right for each sample is from the second set of samples (sample placed in the Symyx PPR at 200° C. and approximately 150 psi for one hour).

In combination, based on visual observation, free oil released and attached to glass wall and oil released in the water phase is greater in the presence of polyamine compared to piperazine and baseline (i.e., without polyamine).

Comparative Examples (CE)

| CE | Chemical Name | Structure |
| --- | --- | --- |
| A | Aniline | |
| B | 2,4,6-Tri-tert-butylaniline | |
| C | Dibenzylamine | |
| D | Hexamethylenetetramine | |

Figure 2:
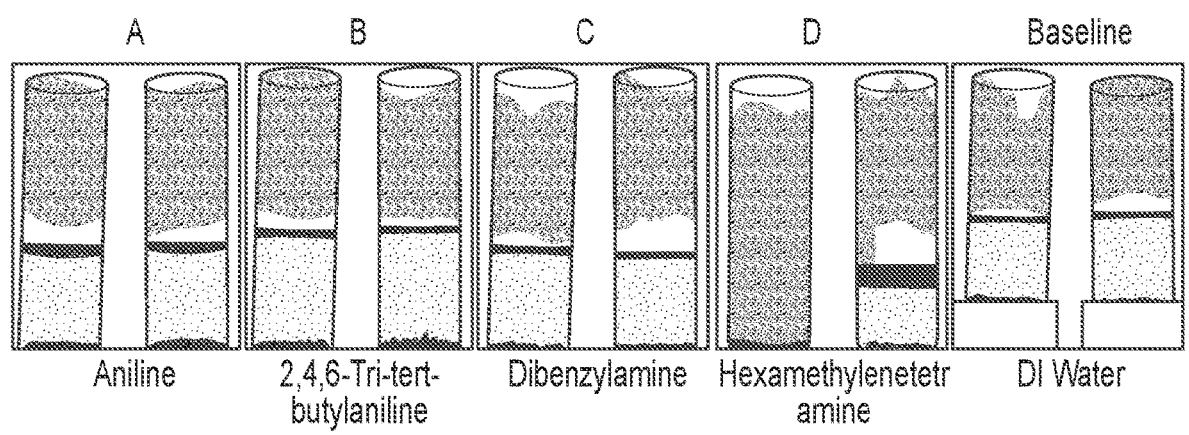
FIG. 2 provides images of samples according to the present disclosure.

In combination, based on visual observation (FIG. 2), free oil released and attached to glass wall and oil released in the water phase is greater in the presence of polyamine compared to aromatic amines (aniline, 2,4,6-tri-tert-butylaniline, and dibenzylamine) and baseline (i.e., without polyamine).

What is claimed is:

1. A method for recovering bitumen from oil sands, comprising:
    contacting the bitumen in the oil sands with (i) steam, water, or both steam and water, and (ii) an organic polyamine having more than two and up to eight amino groups and having a boiling point at one atmosphere of greater than 145° C. and up to 446° C.
    reducing the viscosity of the bitumen with the (i) steam, water, or both steam and water, and (ii) organic polyamine; and
    recovering the bitumen with the reduced viscosity from the oil sands.

2. The method of claim 1, further including combining the organic polyamine with the (i) steam, water, or both steam and water to produce an extraction composition; and
    contacting the bitumen in the oil sands with the extraction composition to reduce the viscosity of the bitumen.

3. The method of claim 1, further including first contacting the bitumen in the oil sands with (ii) the organic polyamine and then second contacting the bitumen in the oil sands with the (i) steam, water, or both steam and water.

4. The method of claim 1, wherein contacting the bitumen in the oil sands with the (i) steam, water, or both steam and water and (ii) organic polyamine and recovering the bitumen is done in-situ in a subterranean formation.

5. The method of claim 1, wherein contacting the bitumen in the oil sands with the (i) steam, water, or both steam and water and (ii) organic polyamine and recovering the bitumen is done in an ex-situ extraction process.

6. The method of claim 1, wherein the organic polyamine is selected from the group consisting of diethylenetriamine, N,N,N',N'',N''-pentamethyldiethylenetriamine, aminoethylpiperazine; hexamethylenetetramine; bis(hexamethylene) triamine; 1,3,5-benzenetriamine; triethylenetetramine, tetraethylenepentamine, polylysine, polyornithine, polyallylamine, dipropylenetriamine, tripropylene tetramine, 1,2-bis(3-aminopropylamino)ethane, histamine, agmatine, cytosine; polymers of ethylene diamine, and combinations thereof.

7. The method of claim 1, wherein the organic polyamine is hexamethylenetetramine.

8. The method of claim 1, wherein the organic polyamine is present with (i) the steam, water, or both steam and water at a concentration of up to 5 weight percent (wt. %) based on the total weight of (i) the steam, water, or both steam and water and (ii) the organic polyamine.

9. The method of claim 1, wherein the step of contacting the bitumen in the oil sands with (i) the steam, water, or both steam and water and (ii) the organic polyamine and the step of recovering the bitumen is part of a Steam Assisted Gravity Drainage process.

* * * * *